United States Patent Office 3,039,865
Patented June 19, 1962

3,039,865
RECOVERY OF MERCURY FROM AQUEOUS SOLUTIONS
Jeffrey F. Gilbert and Constantine N. Rallis, Sarnia, Ontario, Canada, assignors to The Dow Chemical Company, Midland, Mich., a corporation of Delaware.
No Drawing. Filed Dec. 16, 1959, Ser. No. 859,835
Claims priority, application Canada Mar. 20, 1959
4 Claims. (Cl. 75—81)

This invention relates to a method of recovering mercury from aqueous solutions and more particularly relates to the recovery of mercury from dilute aqueous solution, as for example, from spent aqueous electrolytic cell brines containing dissolved mercury.

In the operation of electrolytic cells of the mercury cathode type for the production of chlorine and caustic soda, frequently known as mercury-chlorine cells, a small percent of the metallic mercury cathode is normally lost as it becomes oxidized or reacted to the ionic state and is carried away as a very dilute solution in the spent brine, generally at a concentration of less than 40 p.p.m. mercury. The loss of a small amount of mercury from each of the mercury-chlorine cells of a large plant represents in total a surprisingly large monetary loss per day. A satisfactory method of recovering the mercury so lost is not commercially available.

It is accordingly an object of this invention to provide a low-cost efficient method suitable for the recovery of dissolved mercury present in very low concentrations in aqueous solutions such as spent mercury-chlorine cell brines.

The invention is predicated on the discovery that by bringing an aqueous solution having a pH between about 2 and 11 and containing from about 1 to 500 p.p.m. of dissolved mercury into intimate contact in a reaction zone with a substantially water-stable solid metallic reducing agent having a greater solution potential than mercury, elemental metallic mercury is liberated. The liberated mercury amalgamates the surfaces of the reducing agent and also coalesces into droplets on the said surfaces. Depending on the manner of carrying out the process, hereinafter more fully described, particles of amalgam and mercury droplets are either allowed to fall from the reducing agent and collected from time to time, or the amalgam and mercury droplets are flushed from the surfaces of the reducing agent along with inert solid settlings formed thereon and recovered from the flushing liquid as by settling or filtration. Impure mercury so recovered is purified by standard methods, such as acid washing or retorting or by a combination of methods. If desired, mercury may also be recovered by removing the reducing agent from the reaction zone periodically along with accumulated reaction products and retorting the entire mass.

For purposes of the following specification and claims a substantially water-stable solid metallic reducing agent having a greater solution potential than mercury is referred to hereinafter as a reductor metal.

In carrying out the invention the pH of the aqueous solution containing dissolved mercury is adjusted, if necessary, to a pH value in the range of 2 to 11 but preferably to a pH above 5 and more preferably to narrower pH ranges best suited to the use of individual reductor metals as hereinafter described. The pH of the solution has little primary effect, within the range of about 5 to 11, on the inherent maximum attainable percent of removal of mercury from the solution but has a salutory effect on the amount of reductor metal consumed by reaction with the solution as well as on the reaction rate of mercury ions competing with hydrogen ions in reaction with the reductor metal.

The aqueous solution properly adjusted as to pH, is passed preferably upwardly through a bed of a reductor metal contained in a suitable reactor or column. As reductor metals those readily reducing or liberating mercury from solution as metallic mercury include iron, zinc, bismuth, tin, nickel, magnesium, manganese and copper. Of these iron and zinc are to be preferred because of the lower cost of the metals as well as generally lower solution losses and higher reaction rates when used in the present process. Iron may be used for those solutions advantageously treated at a moderate pH, for example to avoid or minimize precipitation of solids, such as oxides and hydroxides at higher pH values. Optimum mercury removal per pound of iron consumed is obtained upon adjusting the pH of the solution to a value between 6 and 9. At pH values below 6 solution losses of iron become increasingly larger and below a pH of 5 hydrogen evolution reduces the effective surface area of the metal and the aforementioned competition of hydrogen ions with mercury ions becomes significant. At a pH of 7 to 8 the consumption of iron in the form of steel turnings may be expected to be of the order of 0.1 pound per thousand imperial gallons (1200 U.S. gallons) of solution treated by this method. Zinc metal may be used for those solutions that are advantageously treated at a higher pH. Zinc is best used with solutions brought to a pH between 9 and 11. Although zinc readily liberates mercury in less alkaline or in acidic solutions zinc solution losses become increasingly larger at lower pH values. Zinc amalgams such as are produced by the liberation of mercury at the surface of zinc metal are physically more stable than iron amalgams similarly produced and do not suffer the disadvantage of being rather readily carried away in a fine state of subdivision during a flushing cycle as are iron amalgams. On the other hand, iron has the advantages of having a slightly higher reaction rate and of being a less expensive metal than zinc.

The liberation of mercury from the brine is not substantially affected by amalgamation of the surfaces of the reductor metal. The liberation of mercury continues at the amalgamated surfaces and the free mercury not readily forming additional amalgam coalesces and may drip down through the reactor bed if the flow rate is not sufficiently great to carry the droplets away.

Spent brine as it issues from mercury-chlorine cells is saturated with chlorine and generally contains in the order of 1 to 40 p.p.m. of dissolved mercury and about 270 grams per liter of sodium chloride and may contain small concentrations of other alkali and alkaline earth metal salts plus varying amounts of solids such as fine particulate graphite eroded from the cell electrodes. The spent brine is customarily stripped of chlorine by reaction with a suitable reagent or by passing the brine through charcoal adsorption towers. In the latter case finely divided charcoal is thereafter present in the brine. While the method is still operable if all the chlorine is not removed from the brine, the chlorine does react with the reductor metal and with liberated metallic mercury and if present will reduce the efficiency of the method based on reductor metal consumption. The brine is next treated as with caustic soda, though sodium bicarbonate or sodium carbonate may also be used, to bring the acidic brine to a neutral or alkaline condition before recirculation or disposal. The brine, suitably adjusted as to pH, is passed preferably upwardly through a bed of a reductor metal contained in a suitable reactor where the hereinabove mentioned solids as well as oxides, carbonates, hydroxides, etc., are found to have a tendency to settle out on the reductor metal unless a sufficiently high flow rate is employed. Deposition of solids on the reductor metal causes a considerable decrease in the effective surface area of the reductor metal exposed to the brine. It then becomes necessary to periodically flush the said solids away from the reactor bed. Flushing is accomplished by stopping the flow of brine to the reactor and then passing through the reactor, for a time, either a countercurrent or a rapid cocurrent flow of water, the mercury solution being treated, or dilute acid solution. Mercury, amalgam, and solids flushed from the reactor may be filtered off or carried in suspension to settling tanks and there allowed to settle out as a sludge.

The frequency with which the reactor bed should be flushed is mostly dependent upon the amount of solids carried to the reactor by the solution. Removal of particulate matter as by filtration before passing the solution or brine into the reactor makes fewer flushings necessary but does not entirely eliminate the need for flushing. For example, in the use of iron as the reductor metal, graphite is gradually released from the metal itself and iron oxides and hydroxides are formed all of which slowly cause plugging of the reactor bed.

If the solids content of the brine is low, flow rates of the order of 50 to 150 gallons per minuate per square foot (g.p.m./ft.$^2$) may be adequate to keep the reductor metal fairly clean. The actual rate required for clean operation is dependent on the geometry of the reactor and the particle size of the reductor metal. Excessive flow rates are to be avoided as the bed will become fluidized and the reductor metal may be lost, especially if the metal is in finely divided form. With a greater fluid head or space between the top of the bed of reductor metal and the outlet at the top of the reactor there is more opportunity for the reductor metal, if suspended, to settle out again. At flow rates above about 100 to 150 g.p.m./ft.$^2$, some type of retention means for the reductor metal usually is necessary.

Mercury removal efficiency from an aqueous solution containing dissolved mercury is chiefly governed or affected by reaction rates, contact times and the previously mentioned blocking of reductor metal surfaces by solids collecting thereon.

The reaction rate for the reduction of mercuric ion to mercury metal in this process is determined mainly by the nature and state of subdivision of the reductor metal selected. Temperatures in the range of 20 to 80° C. appear to have little effect on the reaction. At higher temperatures the rate of the reduction reaction is increased but so is the rate of wasteful dissolution of the reductor metal into the solution.

Exceedingly slow reaction rates are observed for solutions passed through unpacked pipes formed of the reductor metal. Fine metal powders or granules in the form of a bed in a reactor vessel offer a rather large resistance to fluid flow through the bed. Therefore the reductor metal is preferably employed in the form of metal turnings or shavings although other forms and particle sizes may be used.

The contact time as referred to herein is calculated from the geometry of the bed of reductor metal contained in a reactor vessel or column, the amount of void space estimated in the bed, and the flow rate of solution through the bed. Good mercury removal efficiency is obtained with short contact times under conditions giving a high reaction rate. Contact times for the liberation of a minimum of 90 percent of dissolved mercury with iron metal may vary from as long as 180 minutes using unpacked steel pipes to about 2 minutes using a bed of steel turnings (scrap) to about ½ minute using a bed of 20 mesh iron filings (reagent grade). Similarly, for a minimum of 90 percent mercury removal from a solution by zinc, contact times may vary from 8.5 minutes using a bed of commercial grade zinc shavings to 2.5 minutes for a bed of 20 mesh granular zinc (reagent grade). To maintain proper reactor bed depth, a factor in controlling contact time, the reactor must be recharged with reductor metal from time to time.

The elemental mercury liberated and obtained in impure form from an aqueous solution of mercury during the carrying out of the process of the invention is collected from the bottom of the reactor and/or the settling tanks or filters employed in removing particulate matter from the reactor effluent and flushings. The exact procedure of collecting the impure mercury is obviously dictated by the selected manner of constructing and operating the reactor. The so-collected impure mercury consisting of a mixture of liquid mercury, amalgam and inert solids is then purified as by retorting or by wet chemical methods designed to separate the elemental mercury from the mixture. As an illustrative example it has been found that about 90 percent of the mercury present as both the metal and the amalgam to the extent of 5 percent in a wet sludge is recoverable by retorting the sludge at about 650° C. at atmospheric pressure or at about 320° C. under a pressure of 2.5 millimeters of Hg.

In carrying out wet chemical separation methods the impure mercury is washed according to well known techniques with a dilute acid such as 1 to 3 normal hydrochloric or nitric acid to dissolve hydroxides, oxides, carbonates, etc., and to break down the amalgam and liberate the mercury thereof. After such initial purification the recovered mercury may be further purified as by distillation if desired.

At practical flow rates and contact times 90 percent or more of the dissolved mercury in an aqueous solution such as a spent mercury-chlorine cell brine is readily liberated. Thus, a brine originally containing about 10 p.p.m. dissolved mercury and subjected to the process of our invention carries a residual dissolved mercury content of about 1 p.p.m. Overall mercury recoveries of about 80 percent or better, as a substantially purified metal, are attainable by the process of the invention.

In a series of tests to demonstrate the removal of mercury from aqueous solution during the practice of the invention aqueous solutions of various mercuric and mercurous salts were prepared and each solution in turn passed through two 0.945 inch (inside diameter) reactors connected in series. Both reactors were charged to a bed depth of about 6 inches with scrap iron turnings having a bulk density of about 40 lbs./cu. ft. Each mercury salt solution was introduced to both reactors so as to flow upwardly through the scrap iron bed. Each solution was allowed to pass through the reactors for about 15 minutes before taking samples of the feed to the first reactor and of the effluent from the second reactor. Percent mercury removal from each solution was determined by analyzing the feed and effluent samples for dissolved mercury content. The results of the tests are shown in Table I.

TABLE I

*Mercury Removal From Aqueous Solutions of Mercurous and Mercuric Salts by Reduction With Iron Turnings*

| Mercury Salt | pH of Solution | Flow Rate IG/ (min.) (ft.²) | Contact Time (min.) | p.p.m. of Hg Feed | p.p.m. of Hg Effluent | Percent Hg removal |
|---|---|---|---|---|---|---|
| $Hg_2SO_4$ | 6.5 | 4.17 | 1.54 | 63.5 | 13.7 | 78.4 |
| | | 4.17 | 1.53 | 13.7 | 5.5 | 59.8 |
| | | 4.17 | 3.07 | 63.5 | 5.5 | 91.3 |
| | | 6.85 | 0.95 | 63.5 | 21.5 | 66.1 |
| | | 6.85 | 0.95 | 21.5 | 8.1 | 62.3 |
| | | 6.85 | 1.90 | 63.5 | 8.1 | 87.2 |
| $Hg_2Cl_2$ | 6.5 | 3.58 | 1.81 | 2.7 | 1.0 | 63.0 |
| | | 3.58 | 1.79 | 1.0 | 0.56 | 44.0 |
| | | 3.58 | 3.60 | 2.7 | 0.56 | 79.2 |
| | | 9.39 | 0.69 | 2.7 | 1.4 | 48.0 |
| | | 9.39 | 0.68 | 1.4 | 0.75 | 46.4 |
| | | 9.39 | 1.37 | 2.7 | 0.75 | 72.2 |
| $HgSO_4$ | 5.0 | 3.08 | 2.09 | 30.5 | 6.1 | 80.0 |
| | | 3.08 | 2.08 | 6.1 | 0.7 | 88.5 |
| | | 3.08 | 4.17 | 30.5 | 0.7 | 97.7 |
| | | 6.63 | 0.98 | 30.5 | 14.2 | 53.4 |
| | | 6.63 | 0.97 | 14.2 | 5.6 | 60.5 |
| | | 6.63 | 1.95 | 30.5 | 5.6 | 81.6 |
| $Hg(NO_3)_2$ | 5.5 | 2.89 | 2.23 | 39.0 | 9.5 | 75.6 |
| | | 2.89 | 2.22 | 9.5 | 4.1 | 56.8 |
| | | 2.89 | 4.45 | 39.0 | 4.1 | 89.5 |
| | | 7.26 | 0.89 | 39.0 | 18.0 | 53.8 |
| | | 7.26 | 0.88 | 18.0 | 8.0 | 55.5 |
| | | 7.26 | 1.77 | 39.0 | 8.0 | 79.4 |

NOTE.—IG=Imperial gallons, 1 IG=ca. 1.2 U.S. gallons.

In Table II are shown tabulated data of examples of the liberation of mercury from spent mercury-chlorine electrolytic cell brine during the practice of the invention using various reductor metals.

TABLE II

| Reductor Metal | Contact Time (min.) | pH Feed | pH Effluent | p.p.m. Hg Feed | p.p.m. Hg Effluent | Percent Hg Removal |
|---|---|---|---|---|---|---|
| Cu turnings | 120 | 6.5 | 7.4 | 7.2 | 0.55 | 92 |
| | 30 | 8.7 | 8.2 | 4.9 | 1.9 | 61 |
| Mn chips | 5 | 10.7 | 10.4 | 5.2 | 1.5 | 71 |
| | 15 | 10.7 | 10.2 | 5.2 | 1.9 | 63 |
| Zinc shavings | 12.7 | 9.5 | 9.2 | 4.1 | 0.2 | 95 |
| | 4 | 10.4 | 10.1 | 3.3 | 0.6 | 81 |
| Steel turnings | 1.9–3.1 | 7 | | 2.8 | 0.2 | 95 |
| | 1.9–3.1 | 7 | | 3.9 | 0.6 | 92 |
| | | | | 5.9 | 0.5 | 91 |

Feed refers to brine entering reactor.
Effluent refers to brine leaving reactor.
Percent Hg removal was determined by analysis of feed and effluent brine.

In still an additional test, brine from mercury-chlorine cells was passed upwardly through a 2 in. x 60 in. reactor which had been filled with scrap steel turnings. The reactor was operated continuously for 11 days at flow rates varying from 44 to 233 U.S. gal./min./ft.² during which period a total of about 21,450 U.S. gallons of brine passed through the reactor. After each change in operating conditions the system was allowed to equilibrate and data was recorded for a selected period of time. During some of the test periods there was treated brine containing some residual chlorine. Brines having various pH values were also treated. Mercury removal from the brine was determined by analysis of the feed and the effluent from the reactor. Data obtained during some of the equilibrium periods achieved during the 11 day period are listed in Table III.

The following test operations further illustrate the practice of our invention.

A 13 in. I.D. rubber-lined pipe 7.5 ft. long, having 2 in. inlet and discharge line fittings at the bottom and top respectively, was charged with about 200 lbs. of scrap steel turnings making a bed depth of about 6 ft. A liquid bed 6 in. in depth was provided below the reactor bed to prevent plugging during flushing of the reactor bed. Spent mercury-chlorine cell brine having a pH of 7 to 8 was fed to the inlet of the reactor column. In Table IV is shown the percent of mercury removed from the brine under some differing operating conditions during runs representing periods of continuous operation. Percent mercury removal was determined by periodic analysis of samples of brine entering and issuing from the reactor.

TABLE IV

| Run No. | Hrs. of Operation | Flow Rate I.G.¹/min. | Brine throughput/I.G.¹ | p.p.m. Hg Feed | p.p.m. Hg Effluent | Percent Hg Removal |
|---|---|---|---|---|---|---|
| 1 | 7 | 13.2 | 5,520 | 5.4 | 0.2 | 97 |
| 2 | 16 | 12.3 | 11,890 | 2.5 | 0.2 | 92 |
| 3 | 7 | 12.4 | 5,220 | 6.3 | 0.6 | 91 |
| 4 | 14.5 | 12.5 | 10,850 | 2.9 | 0.5 | 83 |

¹ Imperial gallon is equivalent to about 1.2 U.S. gallons.

The average percent of mercury removal for the four runs is about 90 percent. The trend shown by the tabulated values is typical for sequential intervals following recharging the bed with additional steel turnings.

After each of the runs indicated in Table IV the brine flow was stopped and settlings collected at the bottom of the reactor were withdrawn for retorting. The reactor bed was then flushed by a countercurrent stream of water passed downwardly through the bed at a rate of 5 to 10 I.G. per minute until about 40 to 50 I.G. had passed through the bed. The resulting suspension issuing from the bottom of the reactor was then collected in a settling tank and allowed to settle for about 6 hours after which the clear supernatant liquid was siphoned off. The remaining wet sludge was combined with sludge and settlings from other runs and portions of the combined material were periodically retorted to recover mercury values. About half of the liberated mercury values so-collected

TABLE III

| Length of equilibrium period, hrs. | Feed Brine U.S. Gals. treated | Feed Brine U.S. Gals./min. per ft.² | Feed Brine pH | Feed Brine Cl₂, gms./l. | Feed Brine Hg p.p.m. | Effluent Brine, Hg p.p.m. | Percent Removal |
|---|---|---|---|---|---|---|---|
| 27 | 3,840 | 207 | 5.4 | 0.001 | 16.9 | 1.3 | 92.3 |
| 16 | 1,090 | 100 | 6.5 | <.001 | 3.9 | 1.4 | 64.1 |
| 18 | 1,280 | 104 | 2.8 | .001 | 2.7 | nil | 100 |
| 15 | 506 | 49 | 6.4 | <.001 | 2.8 | nil | 100 |
| 5 | 342 | 100 | 8.5 | <.001 | 1.8 | nil | 100 |
| 3 | 205 | 100 | 8.7 | <.001 | 2.0 | nil | 100 |
| 3 | 477 | 233 | 2.0 | .001 | 4.3 | nil | 100 |
| 5 | 527 | 154 | 7.1 | <.001 | 3.3 | nil | 100 |
| 3 | 316 | 154 | 7.2 | <.001 | 6.5 | 2.0 | 69.2 |
| 6 | 181 | 44 | 4.2 | .003 | 7.0 | 1.1 | 84.3 |
| 16 | 1,100 | 101 | 8.1 | <.001 | 2.9 | 0.4 | 86.1 | had been separated as settlings from the bottom of the reactor and the other half from the sludge recovered from the settling tank.

1000 gram quantities of combined settlings and sludge obtained as above were treated in a 2-liter round bottom flask equipped with a distilling head, a water-cooled condenser and a receiver. Heat was applied to the flask and water was first removed at about 100° C. under atmospheric pressure. The flask and distillation apparatus were then evacuated to 2.5 mm. Hg and mercury distillation was completed in about 3 hours at 320° C.

Results of three such mercury distillations are shown in Table V.

TABLE V

| Run No. | Weight of Charge (gms.) | Percent Hg in Charge | Matallic Hg Collected (gms.) | Percent Hg Recovered |
|---|---|---|---|---|
| 1 | 1,000 | 1.31 | 12.78 | 79.5 |
| 2 | 1,000 | 1.31 | 12.05 | 92.0 |
| 3 | 1,000 | 1.27 | 11.50 | 90.6 |

What is claimed is:

1. A process for recovering mercury from spent aqueous electrolytic cell brine containing from about 1 to 500 parts per million of dissolved mercury and having a pH of less than 5 comprising adding a material selected from the group consisting of caustic soda, sodium bicarbonate and sodium carbonate to the brine to increase the pH value to the range of 5 to 11, bringing the so-alkalized brine into intimate contact with a substantially water-stable solid reductor metal, whereby metallic mercury is liberated and recovering the so-liberated metallic mercury.

2. The process as in claim 1 in which the pH value is brought to the range of 6 to 9 and the reductor metal is iron.

3. The process as in claim 1 in which the pH value is brought to the range of 9 to 11 and the reductor metal is zinc.

4. A process for recovering mercury from spent aqueous electrolytic cell brine containing from about 1 to 500 parts per million of dissolved oxidized mercury and having a pH of less than 5 comprising adding alkaline material to the brine to increase the pH value to the range of 5 to 11, bringing the so-alkalized brine into intimate contact with a substantially water-stable solid reductor metal having a higher solution potential than metallic mercury, whereby metallic mercury is liberated, separating as a sludge from the so-treated brine the liberated metallic mercury along with suspended solids carried by the treated brine until deposited on the reductor metal, and recovering metallic mercury from the said separated sludge.

References Cited in the file of this patent
UNITED STATES PATENTS

| | | |
|---|---|---|
| 1,774,883 | Glaeser | Sept. 2, 1930 |
| 2,032,602 | Stearns | Mar. 3, 1936 |
| 2,204,898 | Lee et al. | June 18, 1940 |
| 2,784,080 | Schmidt | Mar. 5, 1957 |
| 2,860,952 | Bergeron et al. | Nov. 18, 1958 |

OTHER REFERENCES

The Industrial Chemist, July 1929, vol. 5, page 289.

UNITED STATES PATENT OFFICE
CERTIFICATE OF CORRECTION

Patent No. 3,039,865                                June 19, 1962

Jeffrey F. Gilbert et al.

It is hereby certified that error appears in the above numbered patent requiring correction and that the said Letters Patent should read as corrected below.

Column 7, TABLE V, fifth column, line 1 thereof, for "79.5" read -- 97.5 --.

Signed and sealed this 18th day of December 1962.

(SEAL)
Attest:

ERNEST W. SWIDER                                            DAVID L. LADD
Attesting Officer                                             Commissioner of Patents